United States Patent
Suzuka

(10) Patent No.: US 10,013,304 B2
(45) Date of Patent: Jul. 3, 2018

(54) ELECTRICAL APPARATUS, CONTROL DEVICE AND COMMUNICATION METHOD THAT CONTROL COMMUNICATIONS PERFORMED AT DIFFERENT COMMUNICATION RATES

(71) Applicant: Funai Electric Co., Ltd., Daito-shi, Osaka (JP)

(72) Inventor: Takuya Suzuka, Yawata (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 850 days.

(21) Appl. No.: 14/560,155

(22) Filed: Dec. 4, 2014

(65) Prior Publication Data

US 2015/0171993 A1 Jun. 18, 2015

(30) Foreign Application Priority Data

Dec. 18, 2013 (JP) .................................. 2013-260795

(51) Int. Cl.
| | |
|---|---|
| *G06F 13/12* | (2006.01) |
| *G06F 11/07* | (2006.01) |
| *G06F 13/00* | (2006.01) |
| *H04L 1/00* | (2006.01) |

(52) U.S. Cl.
CPC .......... *G06F 11/0793* (2013.01); *G06F 13/00* (2013.01); *H04L 1/0041* (2013.01)

(58) Field of Classification Search
CPC ...................... G06F 11/273; H04B 2203/5495
USPC ....................................................... 710/105
See application file for complete search history.

(56) References Cited

U.S. PATENT DOCUMENTS

| | | | | |
|---|---|---|---|---|
| 4,679,191 A | * | 7/1987 | Nelson ...................... | H04L 5/24 370/355 |
| 5,727,171 A | * | 3/1998 | Iachetta, Jr. ........ | G06F 13/4217 710/107 |
| 6,108,614 A | * | 8/2000 | Lincoln .................. | F24F 11/006 340/3.1 |

FOREIGN PATENT DOCUMENTS

| | | |
|---|---|---|
| JP | 2000-172908 A | 6/2000 |
| JP | 2008-154087 A | 7/2008 |

* cited by examiner

*Primary Examiner* — Titus Wong
(74) *Attorney, Agent, or Firm* — Keating & Bennett, LLP

(57) ABSTRACT

An electrical apparatus includes a controller, a plurality of devices that communicate with the controller at different communication rates, and a common communication line for use in communications therebetween at the different communication rates. The controller performs a first communication process of transmitting data causing a communication error to occur in communication at a second communication rate when transmitting data for use in controlling a first device that supports a first communication rate at the first communication rate via the communication line, the second communication rate being supported by a second device different from the first device, the second communication rate being higher than the first communication rate, and/or a second communication process of transmitting data causing a communication error to occur in communication at the first communication rate when transmitting data for use in controlling the second device at the second communication rate via the communication line.

20 Claims, 9 Drawing Sheets

FIG. 5

|  | Communication rate x (bps) of low-speed device | Communication rate y (bps) of high-speed device |
|---|---|---|
| ex1 | 75 | Higher than 1.2k |
| ex2 | Lower than 300 | Higher than 4.8k |
| ex3 | Lower than 1.2k | Higher than 14.4k |
| ex4 | Lower than 2.4k | Higher than 38.4k |
| ex5 | Lower than 9.6k | 115.2k or 128k |

ELECTRICAL APPARATUS, CONTROL DEVICE AND COMMUNICATION METHOD THAT CONTROL COMMUNICATIONS PERFORMED AT DIFFERENT COMMUNICATION RATES

BACKGROUND OF THE INVENTION

1. Field of the Invention

The present invention relates to an electrical apparatus, a control device and a communication method.

2. Description of the Related Art

FIG. 9 illustrates a configuration of a conventional electrical apparatus 1. The electrical apparatus 1 includes a main controller (a control section 2 equipped with a main CPU) that performs primary control within the electrical apparatus 1; and a plurality of devices 3, 4, 5 and so on that individually communicate with the control section 2. The communications between the devices 3, 4, 5 and so on and the control section 2 are performed at different communication rates (e.g., the communication rates of the devices 3 and 4 are X bps and Y bps, respectively) and in conformity with different communication schemes (e.g., the communication scheme of the devices 3 and 4 is A; the communication scheme of the device 5 is B). The control section 2 has ports a1, a2, b1 and b2. Specifically, the ports a1 and a2 are used to communicate with the devices 3 and 4 in conformity with the communication scheme A; the ports b1 and b2 are used to communicate with the device 5 in conformity with the communication scheme B. In this case, in order to prevent the communication between the control section 2 and an arbitrary one of the devices from causing an improper operation of another device, it is necessary to use a switch SW to switch between the respective communication lines that connect the control section 2 to the devices 3, 4, 5 and so on (a circuit configuration that performs the switching operation and a process of controlling the switching of the switch SW by the control section 2 are required).

On the other hand, a known control device is configured to conduct serial communications between a primary control section and a plurality of terminal control sections by using a signal line. More specifically, the primary control section can communicate with the terminal control sections at different communication rates; a low communication rate and a high communication rate, the high communication rate being an even number of times as high as the low communication rate. When the communication is conducted at the high communication rate, the data bit coming immediately after the start bit is fixed to High, thereby enabling the communications at the high and low communication rates to be discriminated between each other (see JP 2000-172908 A).

When a control section and devices are mounted on respective independent boards in an electrical apparatus, the inner space of the electrical apparatus and the total size of the boards are requested to be reduced as much as possible by decreasing the number of communication lines that connect the boards and the number of components required for this connection. Likewise, even when a control section and devices are mounted on a single board, the inner space of the electrical apparatus and the size of the board are also requested to be reduced by decreasing the number of communication lines that connect them and associated components. Moreover, in some cases, a debugging connector to which an external debugging jig is to be connected is provided at a site of the housing of the electrical apparatus. If the control section is connected to the devices by respective independent communication lines, a plurality of debugging connectors need to be provided in accordance with the number of communication lines. However, in order to carry out debugging work efficiently, decrease the number of components, and improve the appearance, for example, using a minimal number of debugging connectors is preferred.

In the light of the above requests, it can be said that a preferable configuration of the electrical apparatus 1 is that a single common communication line is used for the communications between the control section 2 and the devices 3, 4, 5 and so on and that the switch SW not be used. However, use of the single common communication line, which involves not using the switch SW, may cause improper operations of the devices as described above. For this reason, a configuration that enables a single common communication line to be used but assures a proper operation of each device is needed.

In the above control device described in JP 2000-172908, among the terminal control sections that receive data from the primary control section, a normal-speed terminal starts its communication on the condition that the level on an SYN line becomes Low, and a high-speed terminal that conducts a high-speed communication starts its communication on the condition that the data bit coming immediately after the start bit is High. Thus, if the terminal control sections support different communication rates, it is necessary to individually set the communication starting conditions in these terminal control sections. Consequently, an actual configuration of communications between a primary control section and a plurality of terminal control sections may be complicated.

SUMMARY OF THE INVENTION

Preferred embodiments of the present invention provide an electrical apparatus, a control device and a communication method, which are communications between a plurality of devices and a controller for the plurality of devices and easily enable stable communications therebetween without causing improper operations, with a simple configuration of the communications and simple associated components.

According to an aspect of various preferred embodiments of the present invention, an electrical apparatus includes a controller; a plurality of devices that communicate with the controller at different communication rates; and a common communication line for use in communications between the controller and the plurality of devices at the different communication rates. The controller is configured or programmed to perform a first communication process of transmitting data causing a communication error to occur in communication at a second communication rate when transmitting data for use in controlling a first device that supports a first communication rate at the first communication rate via the communication line, the second communication rate being supported by a second device different from the first device.

In another preferred embodiment of the present invention, the second communication rate preferably is higher than the first communication rate.

In addition or alternatively to the operation of the controller according to the preferred embodiment of the present invention described above, the controller preferably is configured or programmed to perform a second communication process of transmitting data causing a communication error to occur in communication at the first communication rate when transmitting data for use in controlling the second device at the second communication rate via the communication line.

In the above configurations according to various preferred embodiments of the present invention, when a controller transmits data for use in controlling an arbitrary device at a communication rate supported by this device via the common communication line, a communication error occurs in communication at a communication rate supported by another device. In this way, even when the other device receives the data, it does not operate improperly, and a switch SW, as described above, is therefore not necessary.

According to another aspect of various preferred embodiments of the present invention, the controller preferably is configured or programmed to communicate with the devices via the communication line using a frame made up of a preset number of bits as a unit. Specifically, one bit in the data for use in controlling the first device transmitted at the first communication rate may be set longer in duration than one frame in the data for use in controlling the second device transmitted at the second communication rate.

In the above configuration, when the controller transmits the data for use in controlling the first device via the common communication line, the second device receives these data but simply repeats reading the same value over the period of one frame in the data. In this case, since the communication for this frame is not established in the second device, it recognizes the occurrence of a communication error. Therefore, even when the second device receives the data for use in controlling the first device, it does not operate improperly due to these data.

According to yet another aspect of various preferred embodiments of the present invention, when transmitting the data for use in controlling the second device at the second communication rate, the controller preferably is configured or programmed to transmit data in which a final bit is lacking in one frame at the timing of the final bit which is related to the first communication rate.

In this configuration, when the controller transmits data for use in controlling the second device via the common communication line, the first device receives these data but cannot acquire the final bit at the timing of the final bit within the period of one frame in the data. In this case, since the communication for the one frame is not established in the first device, it recognizes the occurrence of a communication error. Therefore, even when the first device receives the data for use in controlling the second device, it does not operate improperly due to these data.

According to still another aspect of various preferred embodiments of the present invention, the plurality of devices may include a plurality of devices configured to communicate with the controller in conformity with different communication schemes. When transmitting data for use in controlling a device that conforms to a first communication scheme in conformity with the first communication scheme via the communication line, the controller preferably is configured or programmed to transmit data causing a communication error to occur in communication conforming to another communication scheme different from the first communication scheme.

In the above configuration, the controller preferably is configured or programmed to transmit data to control an arbitrary device in conformity with a communication scheme which this device conforms to via the common communication line, a communication error occurs in communication conforming to a communication scheme supported by another device. Therefore, even when the other device receives these data, it does not operate improperly.

According to yet another aspect of various preferred embodiments of the present invention, the electrical apparatus preferably further includes a connector that is connected to the communication line and enables external connection of the electrical apparatus.

In the above configuration, only one connector (e.g., debugging connector) is used to establish external connection of the electrical apparatus. Consequently, this electrical apparatus is effective in enhancing an efficiency of work from the outside world through the connector, decreasing an overall cost, improving an appearance, and the like.

The technical ideas, aspects, characteristics and features of various preferred embodiments of the present invention may be implemented using any product other than the above electrical apparatus or any method. For example, a method that involves processing performed by the above electrical apparatus is within the scope of the present invention. More specifically, such a communication method according to a preferred embodiment of the present invention preferably is applied to communications between a controller and a plurality of devices at different communication rates, and involves using a common communication line to conduct communicates between the controller and the plurality of devices at the different communication rates. The communication method includes transmitting data causing a communication error to occur in communication at a second communication rate when transmitting data for use in controlling a first device that supports a first communication rate at the first communication rate via the communication line, the second communication rate being supported by a second device difference from the first device.

In other preferred embodiments of the present invention, the second communication rate preferably is higher than the first communication rate.

In addition or alternatively to the functions of the communication method according to the preferred embodiments of the present invention described above, the communication method preferably includes transmitting data causing a communication error to occur in communication at the first communication rate when transmitting data for use in controlling the second device at the second communication rate via the communication line.

Moreover, a non-transitory computer readable medium including a program that causes hardware (a computer as a controller) to perform the above method can also be regarded as a preferred embodiment of the present invention.

A configuration equivalent to the controller can also be regarded as a single independent product according a preferred embodiment of the present invention.

More specifically, a controller preferably is configured or programmed to communicate with a plurality of devices mounted in an electrical apparatus at different communication rates. The control device preferably is configured to be connected to the plurality of devices by a common communication line for use in communications with the plurality of devices at the different communication rates. The control device preferably is configured or programmed to perform a first communication process of transmitting data causing a communication error to occur in communication at a second communication rate when transmitting data for use in controlling a first device that supports a first communication rate at the first communication rate via the communication line, the second communication rate being supported by a second device different from the first device.

In another preferred embodiment of the present invention, the second communication rate preferably is higher than the first communication rate.

In addition or alternatively to the functions of the communication method according to the preferred embodiments of the present invention described above, the control device preferably is configured or programmed to perform a second communication process of transmitting data causing a communication error to occur in communication at the first communication rate when transmitting data for use in controlling the second device at the second communication rate via the communication line.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 exemplifies combinations of respective communication rates that low-speed and high-speed devices support.

FIGS. 6A and 6B are explanatory views of an $I^2C$ communication scheme.

FIGS. 7A, 7B and 7C are explanatory views of the rate of a clock signal SCL.

DETAILED DESCRIPTION OF THE PREFERRED EMBODIMENTS

Some preferred embodiments of the present invention will be described as follows.

Figure 1:
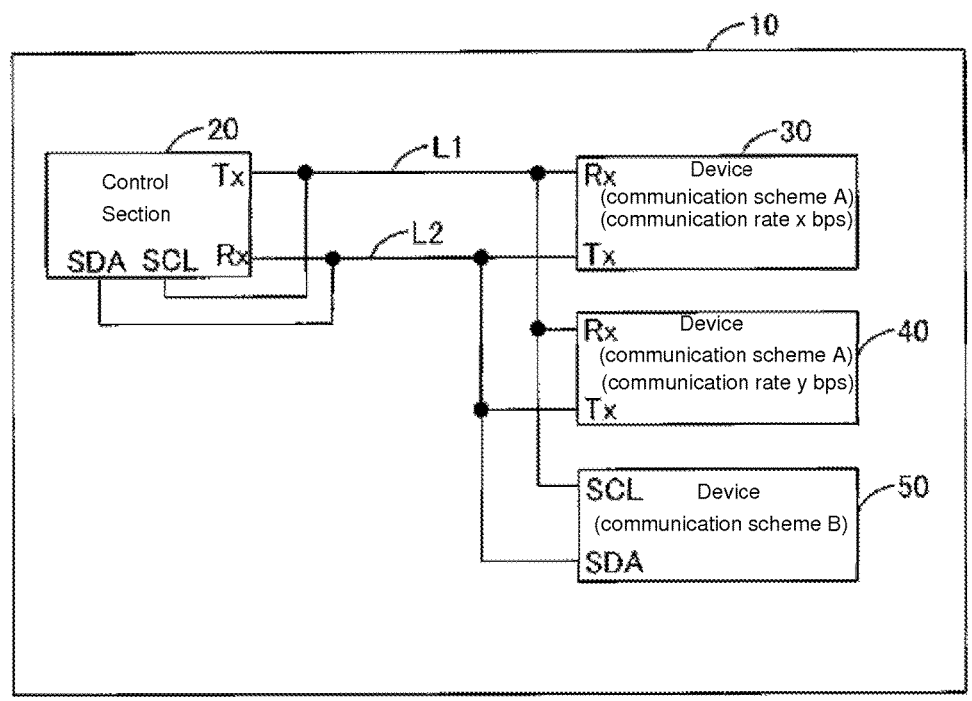
FIG. 1 is a block diagram illustrating a simple configuration of an electrical apparatus.

FIG. 1 is a block diagram illustrating a simple configuration of an electrical apparatus 10. The electrical apparatus 10 is exemplified by a TV set, a recorder, a digital media player, and some other audiovisual system. Specifically, the electrical apparatus 10 includes a controller 20 and a plurality of devices 30, 40, 50 and so on. The controller 20 preferably includes a CPU and a memory (both not illustrated), and is preferably defined by, for example, an integrated circuit using SoC (System-on-Chip). The controller 20 is preferably configured or programmed to control the devices 30, 40, 50 and so on by communicating with them in accordance with a predetermined program stored in the memory, thus controlling the overall operation of the electrical apparatus 10. The controller 20 defines a device that is preferably configured or programmed to perform a communication method of the present invention. In addition, the controller 20 exemplifies a control device according to a preferred embodiment of the present invention.

In this preferred embodiment, for example, the devices 30 and 40 preferably use a communication scheme A as a communication scheme; the device 50 preferably uses a communication scheme B as a communication scheme. The controller 20 conforms to both of the communication schemes used by the devices 30, 40, 50 and so on. For example, the communication scheme A preferably is a UART (Universal Asynchronous Receiver Transmitter) communication scheme that is one of serial communication schemes; the communication scheme B preferably is an $I^2C$ (Inter-Integrated Circuit) communication scheme that is one of serial communication schemes.

With regard to the communication scheme A (UART communication scheme), an output terminal Tx of the controller 20 is connected to respective input terminals Rx of the devices 30 and 40 by a communication line L1, whereas an input terminal Rx of the controller 20 is connected to respective output terminals Tx of the devices 30 and 40 by a communication line L2. With regard to the communication scheme B ($I^2C$ communication scheme), a clock signal (SCL) terminal of the controller 20 is connected to an SCL terminal of the device 50 by the communication line L1, whereas a data signal (SDA) terminal of the controller 20 is connected to an SDA terminal of the device 50 by the communication line L2. For both of the UART and $I^2C$ communication schemes, an NRZ (Non-Return to Zero) signal is used. When such a signal is absent in a signal line, this signal line is maintained at a high level. Accordingly, individual signal lines can be interconnected to and/or from a single common communication line. Each of the communication lines L1 and L2 corresponds to a "common communication line" referred to herein.

The devices 30 and 40 that both use the communication scheme A support communication rates of X bps (bits per second) and Y bps, respectively. Here, the relationship X<Y is preferably satisfied. Herein, the devices 30 and 40 may also be referred to as a "low-speed device" and a "high-speed device," respectively, which are based on the relative difference in communication rate therebetween. Exemplary applications of the low-speed device include a remote control (RC) controller preferably configured or programmed to process RC signals, for example, receive and convert them, and an audio controller preferably configured or programmed to process audio signals. Exemplary applications of the high-speed device include a demodulator that subjects broadcast signals to a demodulating process, and a video processing section that processes video signals. Exemplary applications of the device 50 include a tuner that receives broadcast signals.

Figure 9:
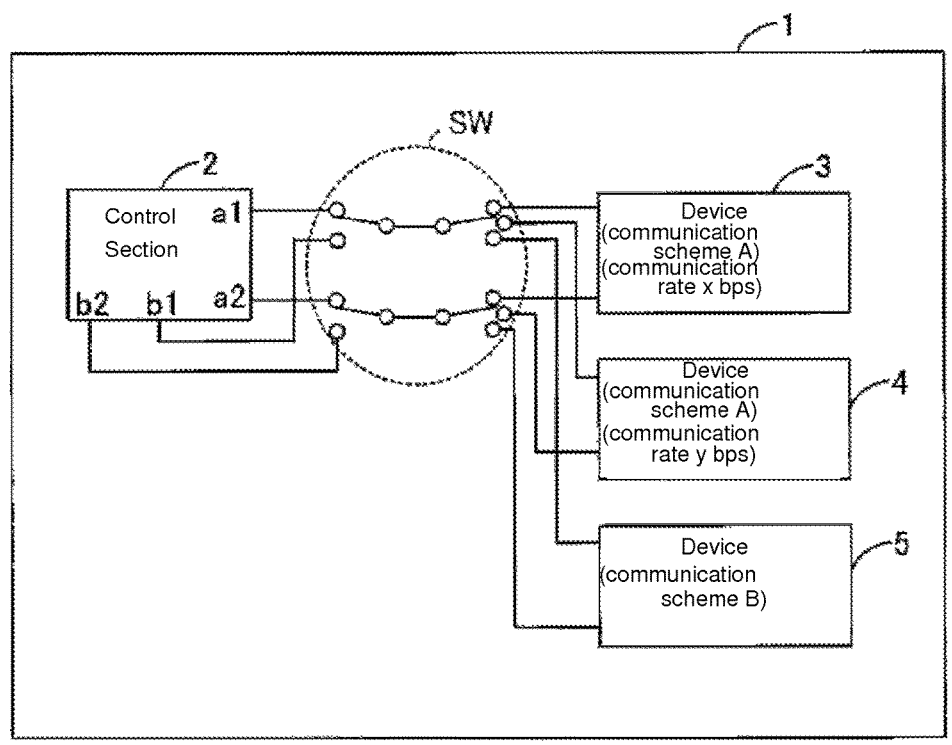
FIG. 9 is a block diagram illustrating a simple configuration of a conventional electrical apparatus.

The electrical apparatus 10 in this preferred embodiment is preferably provided with the common communication lines L1 and L2. The common communication lines L1 and L2 are used for the communications between the controller 20 and the plurality of devices 30, 40, 50 that support different communication rates or conform to different communication schemes. In addition, the switch SW (see FIG. 9) is not provided in contrast to conventional electrical apparatuses. The configuration in which the switch SW is not used and the common communication line is used effectively simplifies communication processing (because the switching control of the switch SW is unnecessary) and decreases the number of components, thus leading to a cost reduction, space saving and downsizing. Furthermore, when the controller 20 communicates with the devices 30, 40, 50 and so on via the communication lines L1 and L2, it controls the communication in such a way that they do not operate improperly.

For example, when the controller 20 transmits data for use in controlling a first device (low-speed device) that supports a first communication rate (X bps) at the first communication rate via the common communication line, the controller 20 transmits data for use in causing a communication error to occur in communication at a second communication rate (Y bps) supported by a second device (high-speed device). Here, the second device differs from the first device; the second communication rate is higher than the first communication rate. When the controller 20 transmits data for use in controlling the second device at the second communication rate via the common communication line, it transmits data for use in causing a communication error to occur in communication at the first communication rate. When the controller 20 transmits data for use in controlling a device that conforms to a first communication scheme, in conformity with the first communication scheme via the communication line, the controller 20 transmits data for use in causing a communication error to occur in communication conforming to another communication scheme that differs from the first communication scheme. If the first communication scheme corresponds to the communication scheme A, the other communication scheme corresponds to the communication scheme B. If the first communication scheme corresponds to the communication scheme B, the other communication scheme corresponds to the communication scheme A.

The quantity of devices in the electrical apparatus 10 is not limited to that illustrated in FIG. 1 (for example, three).

In a first preferred embodiment of the present invention, a description will be given of communications with a plurality of devices (devices 30 and 40) that use the same communication scheme but support different communication rates.

For the UART communication scheme, data (called a frame) made up of a preset number of bits are handled over a communication device, as a unit. It is assumed that the frame is made up of a leading start bit ST, 8-bit data (bit data) b0, b1, b2, b3, b4, b5, b6 and b7, a parity bit P and an end stop bit (final bit) SP. When the device 30 or 40 detects this start bit ST (="0") at its input terminal Rx, it reads the subsequent 8-bit data and parity bit P at the communication rate preset therein. Then, if the device 30 or 40 finally succeeds in reading the stop bit SP (="1"), it recognizes that this communication is normal, accepting the read data (performing processing based on the read data). If the device 30 or 40 fails to detect the stop bit SP (="1") at the read timing according to the communication rate preset therein, it recognizes that this communication is false (a communication error occurs), discarding the read data. When the controller 20 receives a frame at its input terminal Rx from the device 30 or 40, it processes the frame in the same manner as the above.

Only when the device 30 or 40 receives data transmitted from the controller 20, is it controlled in such a way the transmissions from the controller 20 to the device 30 or 40 and from the device 30 or 40 to the controller 20 are not made simultaneously, for example, through the transmission of a response from the corresponding output terminal Tx to the controller 20. The communication rates X bps and Y bps are set for the devices 30 and 40, respectively in advance by the controller 20.

Figure 2A:
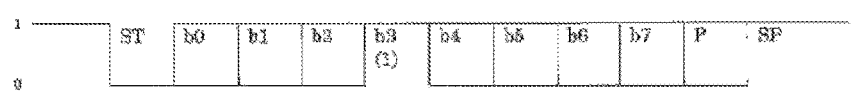
FIGS. 2A and 2B exemplify the difference between timings at which the devices read frames.
Figure 2B:
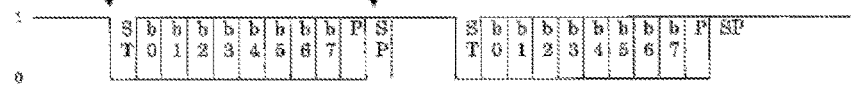
Figure 3A:
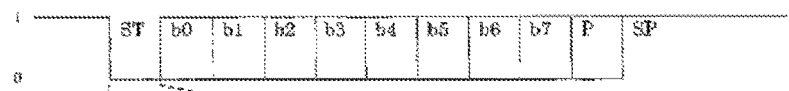
FIGS. 3A, 3B and 3C are explanatory views of a frame rate that a low-speed device supports.
Figure 3B:
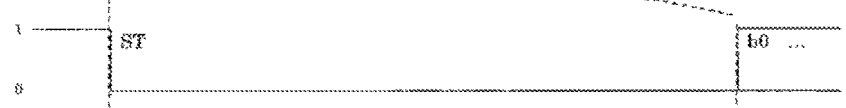
Figure 3C:
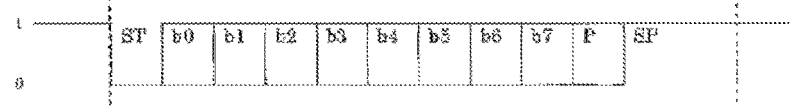
Figure 4A:
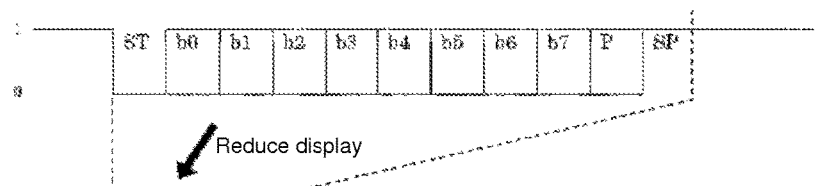
FIGS. 4A, 4B and 4C are explanatory views of a frame rate that a high-speed device supports.
Figure 4B:
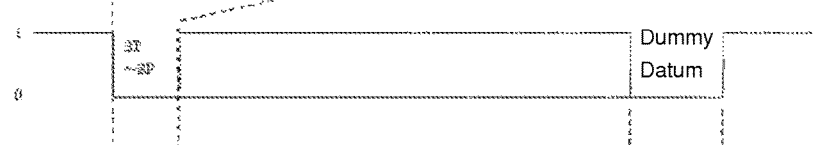
Figure 4C:
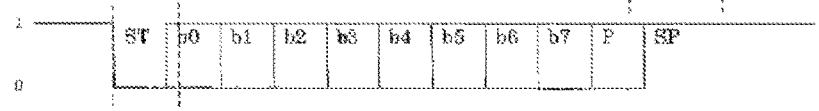

FIGS. 2A and 2B exemplify the difference between timings at which the devices 30 and 40 read frames in conformity with the UART communication scheme. FIG. 2A illustrates the timing at which the device 30 reads a frame at the communication rate X bps; this frame is transmitted at the communication rate X bps from the output terminal Tx of the controller 20 in order to control the low-speed device 30. FIG. 2B illustrates the timing at which the device 40 reads a frame for the low-speed device at the communication rate Y bps. The frame for the low-speed device is received by the low-speed device as well as another device (high-speed device 40 in this case), because this frame is transmitted through the communication line L1. The device 40 starts reading the frame for the low-speed device by detecting the start bit ST (="0") contained in the frame. Here, the communication rate Y bps supported by the device 40 is higher than the communication rate X bps supported by the device 30. Therefore, the device 40 attempts to read the stop bit SP before the entire frame for the low-speed device has been transmitted (e.g., at the time when the bit datum b3 in the frame for the low-speed device is transmitted), as exemplified in FIG. 2B.

If the bit datum b3 is "1," the device 40 erroneously recognizes the bit datum b3 as the stop bit SP, and then accepts the read data that have been read before the coming of the bit datum b3. However, the erroneously recognized data are wrong data for the device 40, because they are transmitted from the controller 20 in order to control the device 30. Therefore, these data may cause the improper operation of the device 40. Thus, under the condition that the switch SW is not used and the device 40 accordingly receives data intended for another device, if the data contain "1" at the timing when the device 40 reads the stop bit SP, there is a risk that the device 40 may operate improperly. Such a risk also arises when the device 30 receives a frame (frame for the high-speed device) that the controller 20 has transmitted at the communication rate Y bps via the communication line L1 in order to control the high-speed device 40.

In order to avoid the above risks, measures are taken in the first preferred embodiment, as will be described with reference to FIGS. 3A to 4C.

When the controller 20 outputs a frame for the low-speed device (see FIG. 3A) from its output terminal Tx, it sets the communication rate X bps so as to be sufficiently lower than the communication rate Y bps supported by the high-speed device (first communication process). More specifically, in setting the communication rate X bps so as to be lower than the communication rate Y bps, the duration of one bit datum in the frame for the low-speed device (see FIG. 3B) is set longer than that of the frame for the high-speed device (see FIG. 3C). Because of this setting, even if the frame for the low-speed device contains a bit datum "0" at a certain timing and the high-speed device detects this bit datum as the start bit ST (="0") through the communication line L1 and the input terminal Rx, this high-speed device cannot detect the stop bit SP (="1") at the timing of reading the stop bit SP which is related to the start bit ST. As a result, the high-speed device decides that the communication using the frame for the low-speed device is false (a communication error occurs), and therefore does not erroneously accept the frame data for the low-speed device. In this way, the controller 20 preferably uses a frame for a low-speed device to reliably communicate with only the low-speed device, while not causing the high-speed device to operate improperly.

When the controller 20 outputs a frame for the high-speed device (see FIG. 4A) from its output terminal Tx, it sets the communication rate Y bps to sufficiently higher than the communication rate X bps supported by the low-speed device (second communication process). More specifically, in setting the communication rate Y bps to higher than the communication rate X bps, the duration of one frame datum in the frame for the high-speed device (see FIG. 4B) is higher than that in the frame for the low-speed device (see FIG. 4C). Further, the duration of the frame for the high-speed device may be shorter than that of one bit datum in the frame for the low-speed device, in accordance with the description based on FIGS. 3A, 3B and 3C. Moreover, when the controller 20 transmits the frame for the high-speed device (see FIG. 4A) from the output terminal Tx as the second communication process, the controller 20 transmits a signal "0" from its output terminal Tx as a dummy datum over a period containing the timing when the low-speed device that has detected the start bit ST (="0") reads the stop bit SP at the communication rate X bps (see the "dummy datum" in FIG. 4B).

If the controller 20 performs the above process, even when the low-speed device detects a start bit ST (="0") in a frame for the high-speed device as a start bit ST, it reads the dummy datum "0" at the timing of reading a stop bit SP which is related to the start bit ST. This disables the low-speed device from detecting the stop bit SP (="1"). As a result, the low-speed device decides that the communication using the frame for the high-speed device is false (a communication error occurs), and therefore does not erroneously accept the frame data for the high-speed device. In this way, the controller 20 preferably uses a frame for a high-speed device to reliably communicate with only the high-speed device, while not causing the low-speed device to operate improperly. The above dummy datum "0" causes neither of high-speed and low-speed devices to operate improperly. For a period over which a dummy datum "0" is transmitted, the controller 20 preferably reserves a sufficiently long time containing the timing when a low-speed device reads a stop bit SP, in consideration of the margin of the timing. In this way, an improper operation of the low-speed device is reliably avoided when a frame for the high-speed device is transmitted.

As described above, when a plurality of devices that use the same communication scheme but support different communication rates share a common communication line to communicate with the controller 20, the first preferred embodiment prevents these devices from operating improperly. In the first preferred embodiment, the controller 20 is configured or programmed to deliberately create communication data for use in communicating with a low-speed device so as to not include a stop bit SP for a high-speed device, and communication data for use in communicating with a high-speed device so as to not include a stop bit SP for a low-speed device. This preferred embodiment may include an aspect of either of a first communication process and second communication process: the first communication process is a process of preventing a high-speed device from operating improperly (making the high-speed device decide that a communication error occurs) when a frame for a low-speed device is transmitted in order to control the low-speed device; the second communication process is a process of preventing a low-speed device from operating improperly (making the low-speed device decide that a communication error occurs) when a frame for a high-speed device is transmitted in order to control the high-speed device.

In consideration of the description according to FIGS. 3A to 4C, a communication rate Y bps supported by a high-speed device is preferably equal to or higher than the product of a communication rate X bps supported by a low-speed device and the number of bits making up one frame (if one frame is made up of 11-pit data: ST, b0 to b7, P and SP, the communication rate Y is preferably at least eleven times as high as the communication rate X bps).

FIG. 5 exemplifies some combinations of communication rates X bps and Y bps supported by low-speed and high-speed devices, respectively, which can be set by the controller 20. Referring to FIG. 5, for example, if 75 bps and 1.2 kbps, for example, are selected as communication rates of low-speed and high-speed devices, respectively, a higher-speed device that uses a communication rate of at least 14.4 kbps is capable of being further used within the electrical apparatus 10. Thus, the first preferred embodiment is applicable to communication conducted by three or more devices that support different communication rates, provided that the condition exemplified in FIG. 5 is satisfied.

In a second preferred embodiment of the present invention, a description will be given of communications with a plurality of devices (devices 30 and 50) that use different communication schemes.

Figures 6A, 6B:
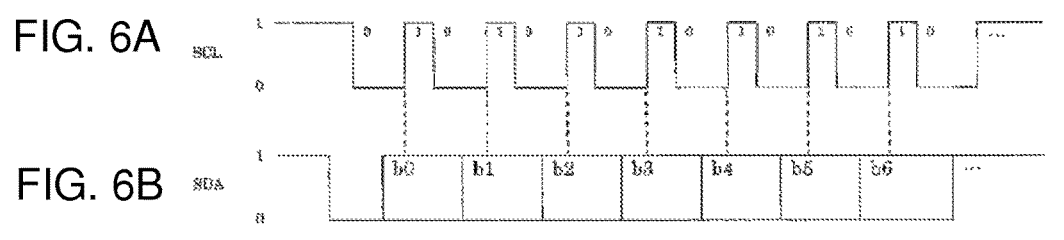

As illustrated in FIGS. 6A and 6B, the controller 20 transmits/receives a data signal SDA to or from the SDA terminal of the device 50 through its SDA terminal, in synchronization with a clock signal SCL transmitted from the SCL terminal of the controller 20. For example, the device 50 reads bit data making up a data signal SDA (see FIG. 6B) from the controller 20 through its SDA terminal, at the timing when a clock signal SCL (see FIG. 6A) detected at its SCL terminal rises from "0" to "1." When the device 50 receives a data signal SDA, it identifies, for example, a unique ID contained in the received data signal SDA, and then transmits a response to the controller 20 through a data signal SDA, indicating the identification of the ID. The communication with the controller 20 is thus satisfied.

Figure 7A:
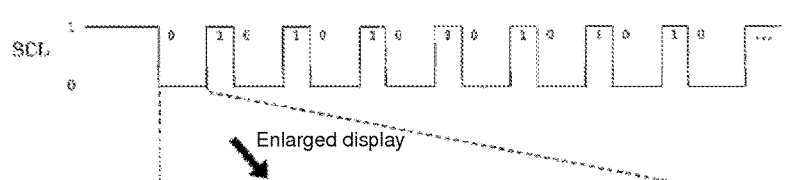
Figure 7B:
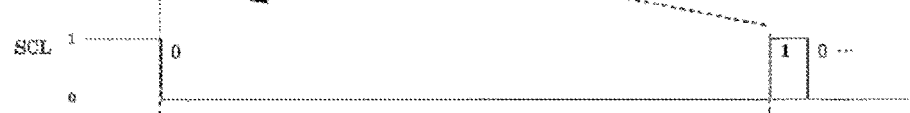

As exemplified in FIGS. 7A, 7B and 7C, in the second preferred embodiment, when the controller 20 transmits a clock signal SCL (see FIG. 7A) from its SCL terminal in order to synchronize the device 50 with the controller 20, it sets the transmission rate of the clock signal SCL so as to be sufficiently lower than a communication rate supported by the device 30. More specifically, the duration (see FIG. 7B) of "0" in the clock signal SCL is set longer than that (see FIG. 7C) of one frame according to the communication rate X bps supported by the device 30. Because of this setting, even when the device 30 detects the transition of a clock signal SCL from "1" to "0" through the communication line L1 and its input terminal Rx as a start bit ST (="0"), the device 30 cannot detect a stop bit SP (="1") at the timing of reading a stop bit SP which is related to the start bit ST. As a result, the device 30 decides that the clock signal SCL is false (a communication error occurs), thus preventing the device 30 from operating improperly on the basis of the clock signal SCL. Because the communication rate Y bps supported by the device 40 is higher than the communication rate X bps supported by the device 30, it can be said that the duration (see FIG. 7B) of "0" in a clock signal SCL is reliably kept longer than that of one frame according to the communication rate Y bps. Therefore, the device 40 decides that the clock signal SCL is false (a communication error occurs), and do not operate improperly on the basis of the clock signal SCL, similar to the device 30.

Consequently, the controller 20 is configured or programmed to reliably conduct communication with the device 50 in conformity with the I²C communication scheme while not causing the device 30 (and the device 40) to operate improperly. Meanwhile, since a data signal SDA enters the input terminal Rx of the controller 20 over a long period that does not contain the timing of reading a start bit ST and a stop bit SP in one frame transmitted from the device 30 or 40, the controller 20 does not also operate improperly.

When the controller 20 communicates with the device 30 or 40 in conformity with the UART communication scheme, communication conforming to the I²C communication scheme is not logically established, because both communications are controlled in such a way that the communication lines L1 and L2 are not used simultaneously, as described above. Therefore, the device 50 does not operate improperly. To be specific, suppose the controller 20 transmits a frame for use in controlling the device 30 or 40 from its output terminal Tx, and the device 50 receives this frame from its SCL terminal. Since the SDA terminal of the device 50 receives no signal in this case (is maintained at a high level), namely, no data signal SDA is present, the device 50 decides that a communication error occurs and therefore does not operate.

As described above, when a plurality of devices that conform to different communication schemes share a communication line to communicate with the controller 20, the second preferred embodiment reliably prevents these devices from operating improperly.

Figure 8:
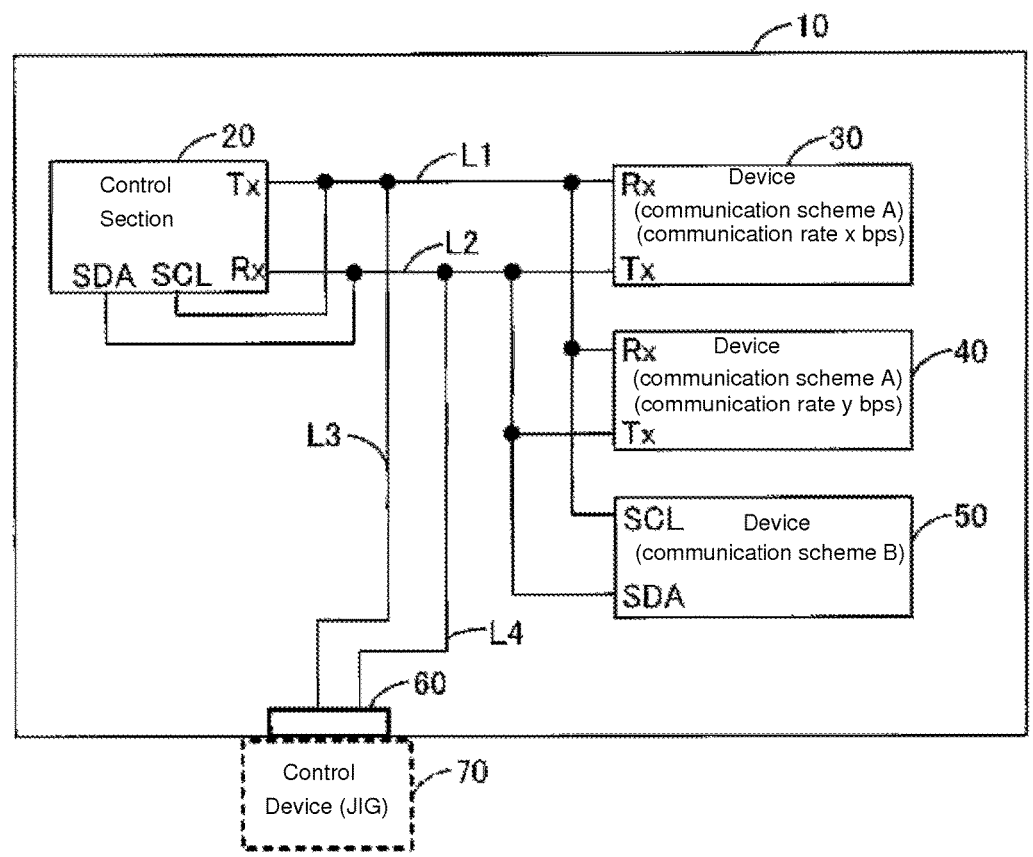
FIG. 8 is a block diagram illustrating a simple configuration of an electrical apparatus according to a third preferred embodiment of the present invention.

FIG. 8 is a block diagram illustrating a simple configuration of an electrical apparatus 10 according to a third preferred embodiment of the present invention. The electrical apparatus 10 according to the third preferred embodiment is provided with a connector 60 connected to communication lines L1 and L2 by communication lines L3 and L4, respectively. The connector 60 is configured to define and function as a debugging connector that enables external connection of the electrical apparatus 10, and an external jig (control device 70) used to debug the electrical apparatus 10 is to be connected to the connector 60. Although not illustrated, the control device 70 preferably includes an output terminal Tx and an SCL terminal; the output terminal Tx and the SCL terminal conform to the UART and I²C communication schemes, respectively, and are to be connected to the communication line L3 (L1) via the connector 60. In addition, the control device 70 preferably includes an input terminal Rx and an SDA terminal; the input terminal Rx and the SDA terminal conform to the UART and I²C communication schemes, respectively, and are to be connected to the communication line L4 (L2) via the connector 60. The control device 70 also is preferably configured or programmed to define a device that performs the communication method according to the present invention, like the controller 20. In other words, the control device 70 preferably is an exemplary control device according to a preferred embodiment of the present invention.

For example, in debugging the electrical apparatus 10, a maintenance person connects the control device 70 to the connector 60, and then establishes communications required for debugging (e.g., communications for use in updating programs and data) between the control device 70 and the devices 30, 40, 50 and so on in the electrical apparatus 10. Then, the control device 70 conducts communications in the same manner as the controller 20 in the first or second preferred embodiment as described above. Therefore, devices (e.g., devices 40 and 50) that are not a communication target device (e.g., device 30) do not operate improperly. Since the debugging connector is connected to the communication lines L1 and L2 shared by the plurality of devices 30, 40, 50 and so on, only one debugging connector is used as illustrated in FIG. 8. This configuration effectively decreases the number of components, thus reducing an overall cost and improving appearance. Accordingly, a maintenance person can debug the individual devices 30, 40, 50 and so on simply by connecting the control device 70 to a single debugging connector. Thus, debugging work can be carried out with improved efficiency.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrical apparatus comprising:
   a controller; and
   a plurality of devices configured to communicate with the controller at different communication rates;
   a common communication line configured to be used in communications between the controller and the plurality of devices at the different communication rates; wherein
   the controller is configured or programmed to perform a first communication process of transmitting data causing a communication error to occur at a second communication rate when transmitting data for use in controlling a first device that supports a first communication rate via the communication line, the second communication rate being supported by a second device different from the first device,
   the controller is configured or programmed to transmit a start bit and a stop bit to the first device in the first communication process,
   the controller is configured or programmed to transmit a dummy datum that is read by the second device at a timing of the stop bit being transmitted to the first device, and
   the dummy datum disables the second device from reading the stop bit transmitted to the first device.

2. The electrical apparatus according to claim 1, wherein the second communication rate is higher than the first communication rate, and the controller is configured or programmed to perform a second communication process of transmitting data causing a communication error to occur in communication at the first communication rate when transmitting data for use in controlling the second device at the second communication rate via the communication line.

3. The electrical apparatus according to claim 1, wherein
   the controller is configured or programmed to communicate with the plurality of devices via the communication line using a frame made up of a preset number of bits as a unit; and
   one bit in the data for use in controlling the first device transmitted at the first communication rate is set longer in duration than one frame in the data for use in controlling the second device transmitted at the second communication rate.

4. The electrical apparatus according to claim 3, wherein when transmitting the data for use in controlling the second device at the second communication rate, the controller transmits data in which a final bit is lacking in one frame at the timing of the final bit which is related to the first communication rate.

5. The electrical apparatus according to claim 1, wherein
   the plurality of devices include a plurality of devices configured to communicate with the controller in conformity with different communication schemes; and
   when transmitting data for use in controlling a device that conforms to a first communication scheme in conformity with the first communication scheme via the communication line, the controller transmits data causing a communication error to occur in communication conforming to another communication scheme different from the first communication scheme.

6. The electrical apparatus according to claim 1, further comprising a connector connected to the communication line, the connector being configured to enable external connection of the electrical apparatus.

7. The electrical apparatus according to claim 1, wherein the electrical apparatus is one of a television, a recorder, a digital media player and an audiovisual system.

8. The electrical apparatus according to claim 1, wherein the controller includes a CPU and a memory.

9. The electrical apparatus according to claim 1, wherein the controller includes an integrated circuit.

10. The electrical apparatus according to claim 5, wherein the communication schemes include a Universal Asynchronous Receiver Transmitter scheme and an I²C scheme.

11. The electrical apparatus according to claim 1, wherein the electrical apparatus does not include a switch.

12. A control device that is capable of communicating with a plurality of devices mounted in an electrical apparatus at different communication rates,
the control device being connected to the plurality of devices by a common communication line for use in communications with the plurality of devices at the different communication rates; and
the control device configured or programmed to perform a first communication process of transmitting data causing a communication error to occur in communication at a second communication rate when transmitting data for use in controlling a first device that supports a first communication rate via the communication line, the second communication rate being supported by a second device different from the first device, wherein
the control device is configured or programmed to transmit a start bit and a stop bit to the first device in the first communication process,
the control device is configured or programmed to transmit a dummy datum that is read by the second device at a timing of the stop bit being transmitted to the first device, and
the dummy datum disables the second device from reading the stop bit transmitted to the first device.

13. The control device according to claim 12, wherein the control device is configured or programmed to communicate with the plurality of devices via the communication line using a frame made up of a preset number of bits as a unit; and
one bit in the data for use in controlling the first device transmitted at the first communication rate is set longer in duration than one frame in the data for use in controlling the second device transmitted at the second communication rate.

14. The control device according to claim 13, wherein when transmitting the data for use in controlling the second device at the second communication rate, the control device transmits data in which a final bit is lacking in one frame at the timing of the final bit which is related to the first communication rate.

15. The control device according to claim 12, wherein
the plurality of devices include a plurality of devices configured to communicate with the control device in conformity with different communication schemes; and
when transmitting data for use in controlling a device that conforms to a first communication scheme in conformity with the first communication scheme via the communication line, the control device transmits data causing a communication error to occur in communication conforming to another communication scheme different from the first communication scheme.

16. The control device according to claim 12, further comprising a connector connected to the communication line, the connector being configured to enable external connection of the electrical apparatus.

17. The control device according to claim 12, wherein the electrical apparatus is one of a television, a recorder, a digital media player and an audiovisual system.

18. The control device according to claim 12, further comprising a controller including an integrated circuit.

19. A communication method in which a controller communicates with a plurality of devices at different communication rates, the communication method using a common communication line to communicate between the controller and the plurality of devices at the different communication rates, the communication method comprising:
transmitting data causing a communication error to occur in communication at a second communication rate when transmitting data for use in controlling a first device that supports a first communication rate via the communication line, the second communication rate being supported by a second device difference from the first device;
transmitting a start bit and a stop bit to the first device; and
transmitting a dummy datum that is read by the second device at a timing of the stop bit being transmitted to the first device, wherein
the dummy datum disables the second device from reading the stop bit transmitted to the first device.

20. A non-transitory computer readable medium including a program that causes hardware to perform the communication method according to claim 19.

* * * * *